(12) United States Patent
Hanf et al.

(10) Patent No.: US 11,629,818 B2
(45) Date of Patent: Apr. 18, 2023

(54) SAFETY SYSTEM FOR MACHINERY

(71) Applicant: ALKEN Inc., Colchester, VT (US)

(72) Inventors: Keith Hanf, Fairfax, VT (US); Allan Rodgers, Jr., Waterbury, VT (US)

(73) Assignee: ALKEN Inc., Colchester, VT (US)

( * ) Notice: Subject to any disclaimer, the term of this patent is extended or adjusted under 35 U.S.C. 154(b) by 0 days.

(21) Appl. No.: 17/087,706

(22) Filed: Nov. 3, 2020

(65) Prior Publication Data

US 2021/0048145 A1 Feb. 18, 2021

Related U.S. Application Data (62) Division of application No. 16/269,993, filed on Feb. 7, 2019, now Pat. No. 10,837,599.

(Continued)

(51) Int. Cl.
*F16P 3/14* (2006.01)
*B26D 7/24* (2006.01)
(Continued)

(52) U.S. Cl.
CPC .............. *F16P 3/145* (2013.01); *B26D 7/24* (2013.01); *F16P 3/147* (2013.01);
(Continued)

(58) Field of Classification Search
CPC ... F16P 3/145; F16P 3/147; F16P 3/12; B02C 23/04; B26D 7/24; A41D 19/0031; A41D 19/0027; A61B 5/01; A61B 5/6806; A61B 5/6843; Y10T 29/49826; Y10T 83/081; Y10T 83/089; Y10T 83/141; Y10T 83/851; A22B 5/00; A22B 5/166; A63B 21/065; A63B 21/075; G06F 3/014; G01L 5/228; G01L 1/205; G05B 13/0265
USPC ......... 83/13, 72, 522.13, 58, 62.1, 581, 490, 83/477.2, 477.1, DIG. 1, 397; 241/36, 241/37.5, 33, 30; 324/234, 300, 676; 340/562, 575, 576, 573.1; 473/202, 205;
(Continued)

(56) References Cited

U.S. PATENT DOCUMENTS 4,965,909 A 10/1990 McCullough et al.
5,272,946 A 12/1993 McCullough et al.
(Continued)

FOREIGN PATENT DOCUMENTS

CA 2457597 A1 * 2/2004 ............. B21D 55/00
EP 1086334 B1 3/2001
(Continued)

*Primary Examiner* — Ghassem Alie
(74) *Attorney, Agent, or Firm* — Lerner David LLP (57) ABSTRACT

A safety system for a machine having a danger zone includes an induction coil having one or more turns extending along the periphery of a part of a worker's body as, for example, extending alone the fingers of a glove worn by the worker. A drive circuit applies a time-varying current having an identifiable characteristic such as the frequency of an alternating current. A magnetic field having the characteristic of the time-varying current is induced in an omnidirectional magnetic field sensor mounted adjacent the danger zone. The magnitude of this field is monitored. When the magnitude exceeds a threshold, a warning signal is issued and protective action may be taken, such as stopping or reversing the machine.

10 Claims, 7 Drawing Sheets

Related U.S. Application Data (60) Provisional application No. 62/628,048, filed on Feb. 8, 2018.

(51) Int. Cl.
    *B25F 5/00* (2006.01)
    *A41D 19/00* (2006.01)
    *B02C 23/04* (2006.01)

(52) U.S. Cl.
    CPC ...... *A41D 19/0027* (2013.01); *A41D 19/0031* (2013.01); *B02C 23/04* (2013.01); *B25F 5/00* (2013.01)

(58) Field of Classification Search
    USPC ...... 73/379.02, 379.09; 425/125–127; 2/160, 2/161.1–161.4
    See application file for complete search history.

(56) References Cited

U.S. PATENT DOCUMENTS

| | | | |
|---|---|---|---|
| 5,315,289 A | | 5/1994 | Fuller et al. |
| 5,444,462 A | * | 8/1995 | Wambach ............... G06F 3/014 |
| | | | 345/158 |
| 5,669,809 A | * | 9/1997 | Townsend ................ F16P 3/12 |
| | | | 452/125 |
| 5,704,066 A | * | 1/1998 | Yamamoto ........... A41D 19/015 |
| | | | 2/160 |
| 6,049,327 A | * | 4/2000 | Walker .................... G06F 3/014 |
| | | | 345/158 |
| 6,853,531 B2 | | 2/2005 | Mather et al. |
| 6,856,852 B1 | | 2/2005 | Bruinsma et al. |
| 6,979,813 B2 | | 12/2005 | Avril |
| 7,210,383 B2 | | 5/2007 | Gass et al. |
| 7,458,106 B2 | * | 12/2008 | Yue .................. A41D 19/01535 |
| | | | 2/159 |
| 7,525,222 B2 | | 4/2009 | Martinez et al. |
| 7,564,361 B2 | | 7/2009 | Yang |
| 8,704,758 B1 | * | 4/2014 | Figley ..................... G06F 3/014 |
| | | | 345/156 |
| 9,044,760 B2 | | 6/2015 | Buchanan et al. |
| 9,301,563 B2 | * | 4/2016 | Hardy ..................... G01L 5/228 |
| 10,247,763 B1 | * | 4/2019 | Wu ........................ G01R 19/155 |
| 2008/0106273 A1 | * | 5/2008 | Bauer .................... G01D 5/202 |
| | | | 324/656 |
| 2008/0197126 A1 | * | 8/2008 | Bourke .................. A43B 7/025 |
| | | | 219/634 |
| 2008/0223844 A1 | * | 9/2008 | Cronn .................... H05B 3/342 |
| | | | 36/2.6 |
| 2017/0273374 A1 | * | 9/2017 | Howland ................ F16P 3/148 |
| 2018/0098550 A1 | | 4/2018 | Grasselli |
| 2019/0020380 A1 | * | 1/2019 | Chiu ........................ G04G 21/04 |
| 2019/0050052 A1 | * | 2/2019 | Hogbin .................. G06F 3/0346 |
| 2019/0101981 A1 | * | 4/2019 | Elias ........................ G09B 5/02 |
| 2020/0029635 A1 | * | 1/2020 | Kiemele ................. G06F 3/014 |
| 2020/0080832 A1 | * | 3/2020 | Lee .................... A41D 19/0027 |

FOREIGN PATENT DOCUMENTS

| | | |
|---|---|---|
| EP | 3096066 A1 | 11/2016 |
| WO | 9966253 A1 | 12/1999 |
| WO | 2015140770 A2 | 9/2015 |

* cited by examiner

SAFETY SYSTEM FOR MACHINERY

CROSS-REFERENCE TO RELATED APPLICATIONS

The present application is a divisional of U.S. patent application Ser. No. 16/269,993, filed on Feb. 7, 2019, which claims the benefit of the filing date of U.S. Provisional Patent Application No. 62/628,048 filed Feb. 8, 2018, the disclosures of which are incorporated herein by reference.

BACKGROUND OF THE INVENTION

The present invention relates to safety systems for machines.

Numerous industrial machines have inherently dangerous elements which can pose a hazard to a worker if the worker's hands or other body parts come in contact with them. For example, in the meat processing industry, open-face skinning machines are used to remove skin and membranes from pieces of meat. These hazards are particularly acute where the nature of the machine and work process require that the worker manipulate a workpiece in a region close to the hazardous element. A typical open-face skinning machine has a sharp horizontal blade disposed just above the plane of a work table. A guard extends just above the blade. A set of rotating wheels are mounted on a shaft parallel to the blade, with the tops of the wheels extending upwardly through the work table. These wheels rotate so that the top portions of the wheels move in a downstream direction toward the blade. In use, the worker manipulates a piece of meat having skin on a surface so that the skin is pulled into the blade by rotation of the wheels and fed through the blade while the worker continually manipulates the piece of meat to feed the skin into the wheels. The worker must bring his hands close to the wheels and blade without touching them. If the worker's hands become engaged with the wheels, the skin of the worker's hand may be fed into the blade causing a significant injury. Typically, a worker operating a skinning machine will wear protective gloves, but gloves of this nature can only mitigate an injury and not prevent it. It has been proposed to embed electrical conductors in a glove worn by the worker so that if the worker encounters the wheels or blade, electrical conductivity will be established between the machine part and the conductor in the glove. A sensing circuit detects such conductivity and stops or reverses the motion of the machine when conductivity is detected. However, systems of this nature also can only mitigate an injury and not prevent it.

Various systems have been proposed for stopping or reversing a machine if the hands or other body parts of a worker approach a dangerous element of a machine. The systems are described, for example, in WO 99/66253; EP 3096066; EP 1086334; WO 2015/140770; U.S. Pat. Nos. 6,979,813; 6,853,531; 9,044,760; and 5,315,289. However, despite significant effort devoted in the prior art heretofore to safety systems of this nature, still further improvement is necessary.

SUMMARY OF THE INVENTION

One aspect of the invention provides safety system for a machine having a danger zone. A system according to this aspect of the invention desirably includes a sending unit having an inductor and a receiving unit having a magnetic field sensor with one or more transducers arranged to provide one or more transducer signals representing the strength of a magnetic field induced in the sensor. A first one of units desirably is adapted for mounting to a body part of a worker to be protected. A second one of units desirably is adapted for mounting adjacent to the machine adjacent the danger zone. At least one of the units desirably operative to send or receive magnetic fields omnidirectionally. The system desirably includes a drive circuit connected to the inductor of the sending unit. The drive circuit desirably is operative to apply a time-varying current in the inductor having a drive characteristic such that the inductor emits alternating time-varying magnetic field having the drive characteristic. For example, the drive circuit may be arranged to apply an alternating current at a drive frequency. A detector circuit desirably is connected to the magnetic field sensor, the detector circuit being operative to provide a warning signal when the one or more transducer signals indicate that the magnitude of a magnetic field varying with the drive characteristic exceeds a threshold value.

A further aspect of the invention provides an element for use in a safety system. The element according to this aspect of the invention desirably includes a support including a body region adapted to overlie at least a portion of a palm or back of a human hand and one or more elongated digit regions projecting from a base adjacent the body region to a tip remote from the body region, each digit region being adapted to overlie a digit of the hand when the body region overlies the palm or back of the hand. The element desirably further includes an induction coil having one or more turns of a conductor. Each turn of the coil desirably includes one or more digit sections having a pair of elongated runs extending from the base of one said digit region to the tip of that digit region and a bend adjacent the tip of that digit region. For example, the support includes five digit regions may include and each turn of the coil may include five digit sections, the digit regions being adapted to overlie all five digits of a human hand so that the bends of the turns are disposed at the tips of the digits. The support may be in the form of a glove. Desirably, each turn of the coil includes one or more main sections extending along a periphery of the body region of the support. The element according to this aspect of the invention may be used, for example, as one of the units in the safety system according to the preceding aspect of the invention.

Yet another aspect of the invention provides a method of protecting a worker from a machine having a danger zone. The method according to this aspect of the invention desirably includes the steps of monitoring a magnitude of inductance between a first unit mounted on a body part of the worker and a second unit mounted on the machine adjacent the danger zone by sending a time-varying magnetic field having a drive characteristic from one of the units and measuring the magnitude of a time-varying magnetic field having the drive characteristic induced in the other one of the units. Preferably at least one of the sending and measuring being performed ominidirectionally. The method according to this aspect of the invention desirably includes providing a warning signal when the inductance exceeds a threshold.

DETAILED DESCRIPTION

A safety system according to one embodiment of the invention, includes a first unit 10 which in this embodiment acts as a magnetic sender. The magnetic sender includes an inductor in the form of a coil 12 having five turns 14a-14e disposed on a coil support. The coil support structure includes a flexible dielectric sheet 16 which in turn is mounted on a glove 18 adapted to receive the hand H of a worker, the hand being shown in broken lines in FIG. 1. The turns 14a-14e are formed as a continuous strip of conductive material such as copper or other metal on the dielectric sheet. The turns may be formed on the dielectric sheet by conventional techniques used to fabricate flexible printed circuits. For example, a laminate including the material of the dielectric sheet and a sheet of the conductive metal may be selectively etched to form the turns using conventional photo etching techniques. Any number of turns may be used, i.e., one or more turns. The dielectric sheet 16 of the support includes a body region 20 which is adapted to overlie a portion of the main body of a human hand adjacent the knuckles and thumb joint, and has five digit portions 22 projecting from the main body portion 20. Each digit region 22 joins the main body portion at a base 24 and extends outwardly from the base to a chip remote from the main body portion. Each turn 14 of coil 12 includes a digit section extending along one of the digit regions. Each digit section includes a pair of elongated runs 28 spaced apart from one another and extending generally parallel to one another from the base 24 of the corresponding digit region and a bend 30 adjacent the tip 26 of the corresponding digit region. Thus, when the support is in place on the hand of a worker, the runs 28 of each digit section will extend along the thumb and fingers of the worker from the body of the hand, with the bend 30 being disposed adjacent the tip of the thumb or finger. Although the runs 28 of the digit regions are depicted as wholly or partially straight in FIG. 1, it should be appreciated that the digit regions will curve and bend with the fingers and thumb of the wearer's hand during operation. Each turn 14 of the coil also includes body portions 32 connecting the digit sections of the turn to one another. The body portions extend adjacent the perimeter of the body region 20. The turns 14a-14d of coil 12 are continuous with one another and in series with one another, with the various regions of each turn extending alongside the corresponding regions of the other turns. The coil terminates at a first terminal 34 connected to the innermost turn 14a and a second terminal 36 connected to the end of outermost turn 14e.

Figure 1:
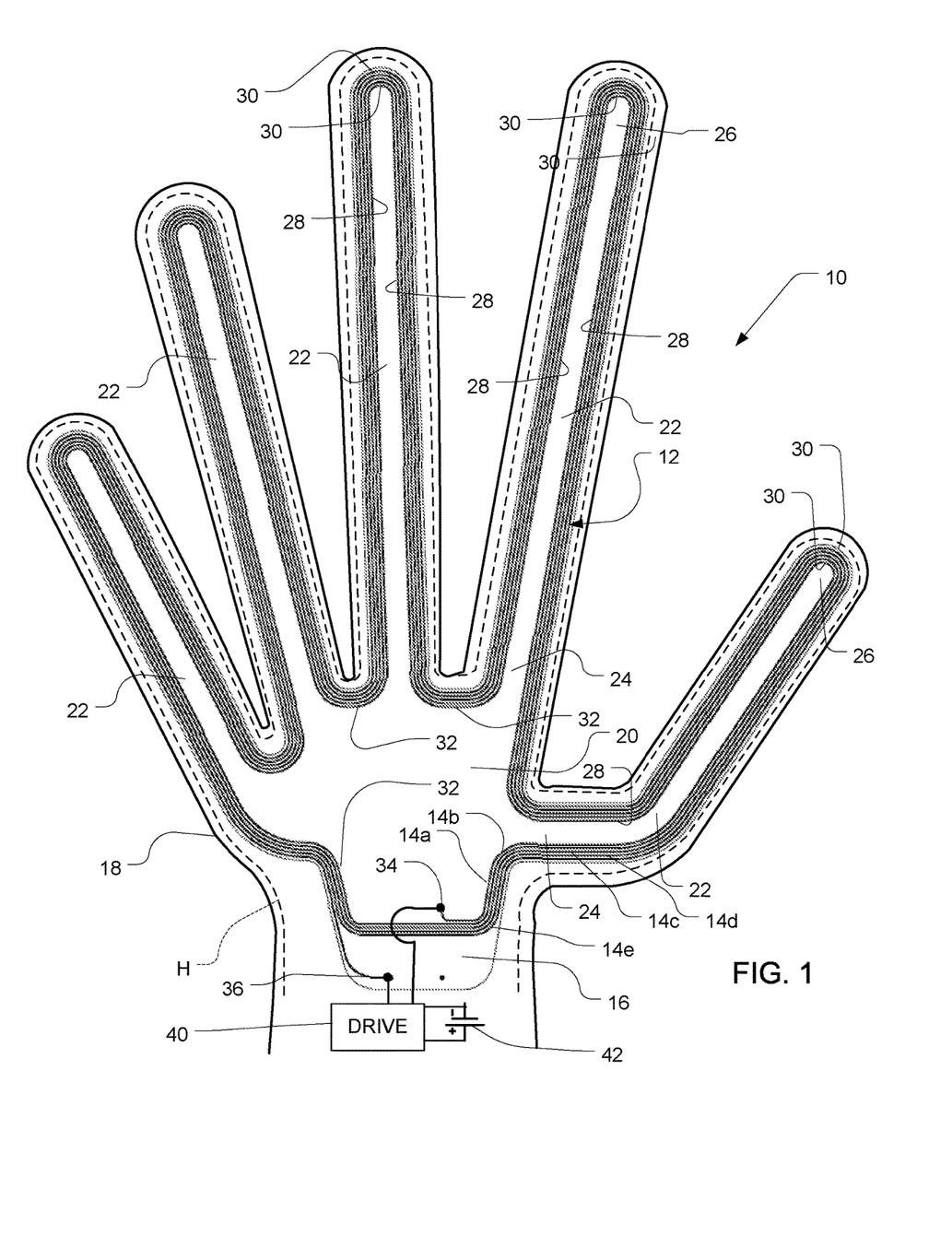
FIG. 1 is a diagrammatic plan view of a unit used in a system according to a first embodiment of the invention.

A drive circuit 40 is connected to the terminals 36 and 34 of coil 12. The drive circuit is arranged to apply an alternating potential across the terminals and thus drive an alternating current through the turns of coil 12 at a drive frequency. Preferably, the drive frequency is about 1 kHz to 200 kHz, more preferably about 1 kHz to about 100 kHz, and most preferably about 10 kHz to 40 kHz, i.e., in the high audio frequency range. Drive circuit 40 may include a conventional oscillator using a resonant circuit as a frequency determining element; a voltage controlled oscillator phase locked to a crystal oscillator, or the like. Most preferably, however, drive circuit 40 includes a digital circuit arranged to provide a series of values in a time sequence such that successive values approximate a sine wave having the desired drive frequency. The drive circuit desirably also includes a digital-to-analog converter arranged to translate each of the values into a corresponding voltage or current proportionate to the value, and may include one or more amplification stages for amplifying the voltage or current. Drive circuit 40 desirably is powered by a battery 42. Desirably, the drive circuit and battery are mounted on the coil support structure as, for example, on the glove 18 or on the dielectric support 16.

Figure 2:
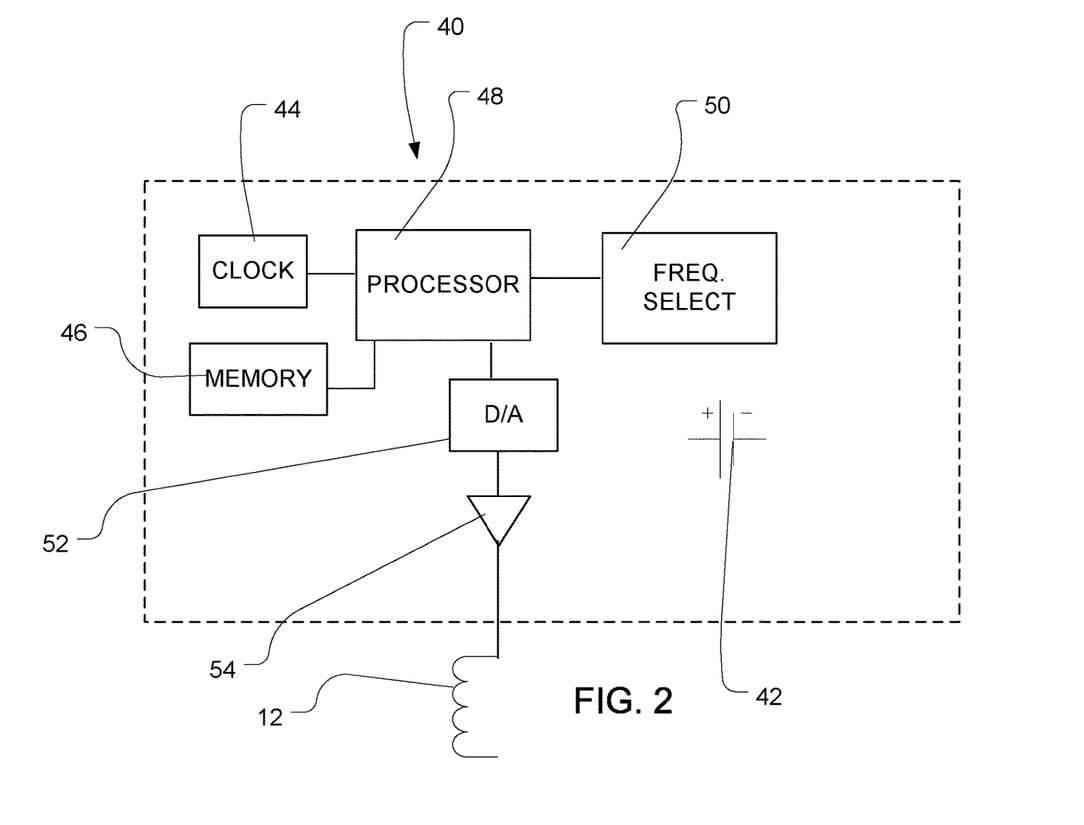
FIG. 2 is a functional block diagram of a circuit used in the unit of FIG. 1.

One form of such a circuit is diagrammatically illustrated in FIG. 2. It includes an internal clock 44 operating at a frequency much higher than the desired drive frequency; a memory 46 storing several different sequences of values corresponding to sine waves of different frequency, and a digital processor 48. The processor 48 is connected to an input device 50 for selecting a desired drive frequency. For example, frequency selection input 50 may include a set of switches connected to processor 48, the processor being operative to interpret the settings of the switches as calling for a particular one of the available frequencies. The processor is operative to read out the sequence of values in memory 46 corresponding to the desired drive frequency repetitively and the deliver those values to digital-to-analog converter 52. An amplifier 54 is linked to the digital-to-analog converter so that each value is converted to a voltage by converter 52 which is then amplified by amplifier 54 and delivered to coil 12. In other embodiments, the processor 48 may be arranged to calculate the series of values during operation rather than retrieve the same from memory. Circuits of this nature are widely used in generating sinusoidal signals and accordingly are not further described herein.

The system further includes second unit 60 which in this embodiment acts as a magnetic field sensor. The field sensor 60 in this embodiment includes an elongated bar 62 of a ferromagnetic material such as ferrite, Mu metal, or other ferromagnetic material. Desirably, the material of the bar has high magnetic permeability. Bar 62 in this embodiment is rectangular in cross-section and straight. Directions relative to the bar are referred to herein with reference to three arbitrary axes X, Y, and Z, the X and Y axes being perpendicular to the length of the bar and perpendicular to one another. The Z axis extends along the length of the bar and is perpendicular to the X and Y axes. A first coil 64 has windings encircling the bar and encircling the X axis. One such winding 64' is shown in FIG. 4. Winding 64' of coil 64 lies in a plane 65 parallel to the Y and Z axes and extends around the top, bottom, and ends of bar 62, bar 62 being omitted in FIG. 4 for clarity of illustration. A second coil 66 (FIG. 3) has windings as shown schematically at 66' in FIG. 4. These windings are disposed in a plane 67 parallel to the X and Z axes so that each winding 66' extends over the front, rear, and ends of bar 62. Thus, windings 66' of coil 66 encircle the Y axis. A third coil 68 has windings 68' which extend around the top, rear, bottom, and front of the bar, these windings 68' being disposed in a plane parallel to the X and Y axes so that these windings encircle the Z axis or lengthwise direction of the bar.

Each winding is sensitive to changes in the magnetic field parallel to the axis encircled by its windings. Thus, coil 64 is sensitive to varying magnetic fields within bar 62 having a field direction parallel to the X axis and thus is referred to as the X coil in some places within this disclosure. Similarly, coil 66 is referred to as the "Y coil" and is sensitive to variations in magnetic field directed along the Y axis through bar 62 and coil 68 is sensitive to variations in a magnetic field directed along the Z or lengthwise axis of the bar. The voltage appearing on each coil is referred to herein as the "coil signal" from that coil. The coil signal has a magnitude and a sign. For example, a positive sign for the X coil signal indicates a field component along the X axis in the direction indicated as "X+" in FIG. 4 whereas a negative sign indicates a field in the opposite direction "X−".

Figure 5:
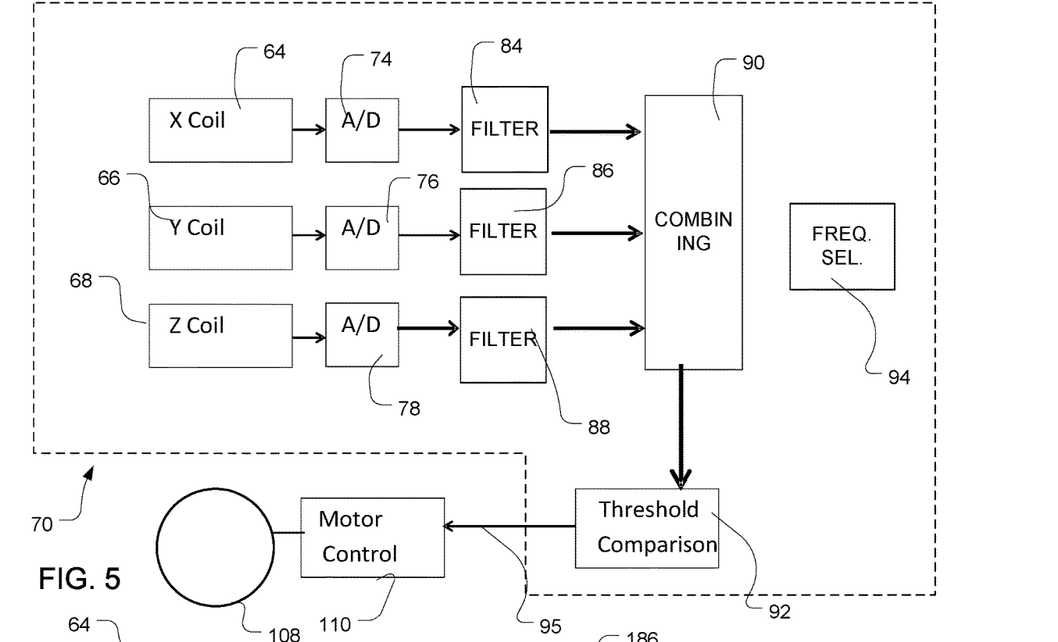
FIG. 5 is a functional block diagram depicting a circuit used with the unit of FIG. 3, in conjunction with elements of the machine to be protected.

The system further includes a detector circuit connected to sensor 60. The detector circuit includes analog to digital converters 74, 76, and 78. Each such converter is associated with one of the coils and is arranged to detect a voltage appearing on the associated coil and provide a digital representation of that voltage. Converter 74, 76, and 78 may include conventional analog to digital converters and may also include elements such as analog amplifiers for amplifying the voltage from the coils prior to digital conversion. The analog to digital conversion circuits 74, 76, and 78 desirably operate at a sampling frequency at least twice the drive frequency. The output from each analog to digital conversion circuit is delivered in the form of a series of digital values representing samples of the coil signal from the associated coil taken at discrete times, so that each sample represents the coil signal at a particular sampling time. The digital samples of the X coil signal from analog to digital conversion circuit 74 are filtered by a digital band pass filter 84 having a relatively narrow pass band encompassing the drive frequency, so as to provide a series of digital samples representing a component of the X coil signal varying at the drive frequency at particular times. Likewise, the digital samples of the Y coil signal and Z coil signals from converters 76 and 78 are filtered by corresponding filters 86 and 88. Thus, the filtered samples passing from filters 84, 86, and 88 at any given time represent three time varying components of the magnetic field at varying at the drive frequency along the three orthogonal axes X, Y, and Z. These samples are directed to a calculator 90 which combines the samples representing the filtered coil signals for each sampling time in such a manner as to yield a single value representing the magnitude of the time varying magnetic field in bar 62 at the drive frequency. This value can be computed by calculating the square of each value of each filtered coil signal, summing the squares and taking the square root of the result. That is:

$$M_f = \sqrt{V_x^2 + V_y^2 + V_z^2} \quad \text{(Formula 1)}$$

Where:

$M_f$ is the magnitude of the magnetic field varying at the drive frequency in bar 62; and $V_x$, $V_y$ and $V_z$ are the values of the filtered X, Y and Z coil signals.

Thus, the combining circuit 90 continually delivers a series of values of $M_f$ representing the magnitude of the time varying magnetic field vector in bar 62 of sensor 60 at successive sampling times. These values are independent of the particular direction of the magnetic field. The value of $M_f$ is proportional to the amplitude of the time-varying current at the drive frequency in inductor coil 12 and to a coupling coefficient representing the strength of inductive coupling between coil 12 and the bar 62 of sensor 60. Desirably, the amplitude of the time-varying current in coil 12 applied by drive circuit 40 (FIG. 1) is constant, and thus the field magnitude $M_f$ represents the strength of inductive coupling between coil 12 and sensor 60. These values are delivered in sequence to a comparator 92, which continually compares successive values to a set threshold. When the magnitude $M_f$, and hence the strength of inductive coupling, exceeds the threshold, the threshold comparison circuit issues a warning signal on an output line 94.

The comparison may take into account only a single value of the magnitude $M_f$ or may take into account several values as, for example, by issuing the warning signal on output line 94 if, and only if, the magnitude exceeds the threshold several times during an interval corresponding to a few cycles of the drive frequency.

The digital circuit also includes an input device 94 which may be any conventional input device such as a set of switches, a keyboard, or a link to an external source for inputting the drive frequency to be used by filters 84, 86 and 88. The drive frequency used by detector circuit 70 should be the same as the drive frequency used by drive circuit 40 (FIG. 1) discussed above. The components of detector circuit 70 are depicted in FIG. 5 in functional, diagrammatic form. These components may be implemented as separate hardware elements or as programmable elements such as a general-purpose processor having appropriate software instructions to perform the functions discussed above. Also, although the discussion above uses digital sampling and processing, the same signal processing may be performed in whole or in part by analog components.

Figure 3:
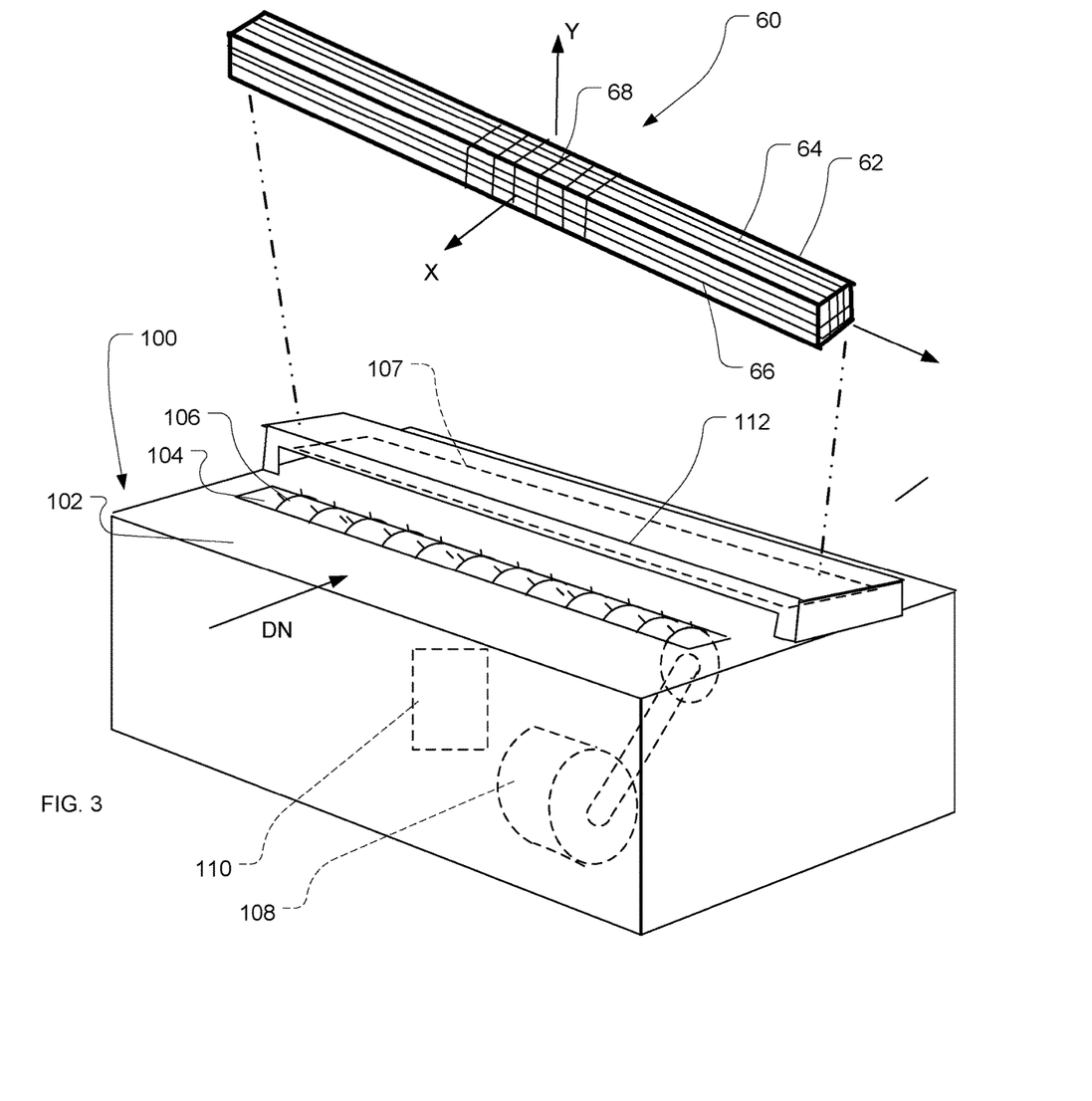
FIG. 3 is a diagrammatic, partially exploded perspective view of another unit used in the system according to the first embodiment of the invention, in conjunction with a machine to be protected.
Figure 4:
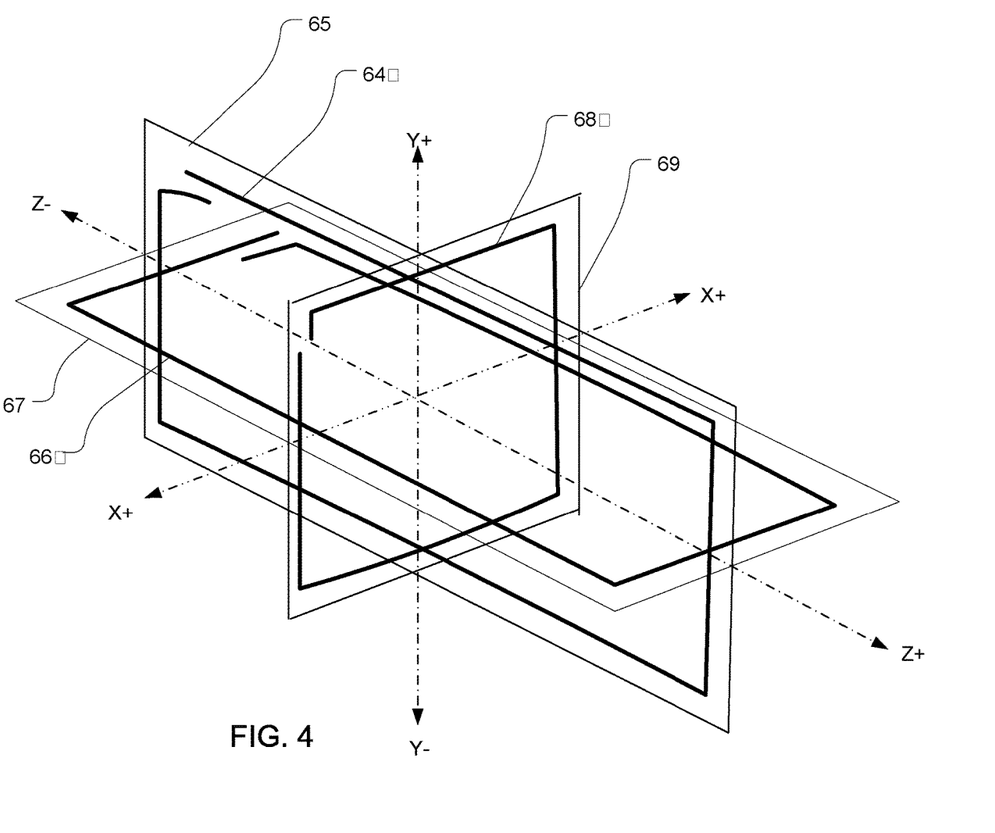
FIG. 4 is a diagrammatic perspective depicting windings included in the unit of FIG. 3.

In FIG. 3, the system is shown as being used in conjunction with an open face skinning machine 100. The machine has a housing with a flat work surface 102 and an elongated slot-like opening 104 extending through the work surface. A series of wheels 106 are mounted on an axle disposed beneath the work surface 102 so that upper portions of the wheel protrude slightly above the work surface. The wheels have projections extending from their periphery so that they can engage a piece of meat. The wheels are mounted on an axle (not shown) disposed beneath the work surface. This axle is driven by a motor 108 so as to spin the wheels and drive the upper portions of the wheels projecting above work surface 102 in a downstream direction DN indicated by an arrow in FIG. 3. A stationary knife 107 depicted in broken lines is supported just above the work surface 104 just downstream from the wheels. A safety guard 112 in the form of a thin strip of metal such as stainless steel is mounted just above knife 106.

Motor 108 is linked to a motor controller 110 so that power is supplied to the motor by the controller when the machine is operating. Sensor 60 is mounted atop or within safety guard 112, or may replace the safety guard. In operation, a worker can manipulate a cut of meat so as to bring a portion of the cut into contact with wheels 106. The portion of the meat engaged by the wheels is pulled in toward the knife 107 so that the knife engages skin, rind or other surface layer on the engaged portion of the meat and severs the skin or rind from the meat. The worker continually moves and rotates the meat so as to bring a fresh portion of the meat into engagement with the wheels and knife. The skin is stripped off as a continuous layer passing underneath safety guard 112 and beneath the knife 107 while the meat remains upstream of the knife and safety guard. During this process, the worker's hands may engage the wheels and be drawn into the knife.

The output 94 from the detector circuit 70 is connected to the motor controller 110. The motor controller is arranged to react to a warning signal on output line 94 by stopping or reversing the motor 108 and thus stopping or reversing the rotation of wheels 106.

In operation, a worker wearing support glove 18 on his finger or hand, operates the machine and presents pieces of meat to the wheels. During this process, the operator's hand may be in essentially any orientation, with the fingers and thumb bent to varying angles. As the worker's hands come into proximity with the sensor 60, the varying current at the drive frequency in coil 12 is inductively coupled to the sensor 60. Stated another way, the time varying magnetic field generated by coil 12 induces a corresponding time varying magnetic field at the drive frequency within sensor 60 and specifically within the ferromagnetic bar or bar 62 of the sensor. This time varying magnetic field extends through coils 64, 66, and 68 of the sensor and thus induces a time varying voltage at the drive frequency within each coil. Thus, the coil 12 is inductively coupled to the coils 64, 66, and 68 of sensor 60. The strength of such inductive coupling varies dramatically with distance. For a pure magnetic dipole, the magnitude of the magnetic field induced in another body will vary as $1/D^6$, where D is the distance between the magnetic dipole and the other body. The exact mathematical relationship of induction to distance for coil 12 and sensor 60 is not known and will vary to some degree with the particular orientation of the hand, curvature of the fingers and the like, but is close to that of the pure dipole in that the strength of coupling increases rapidly as the distance decreases. At distances between coil 12 and sensor 60 greater than a few centimeters, the magnitude of the field in sensor 60 is very low, but rises dramatically as the coil approaches the sensor to within a few centimeters. If the worker's hand approaches sensor 60 closer than a threshold distance, the magnitude of the magnetic field will rise above the threshold and the detector circuit 70 will issue the warning signal, whereupon the motor control 110 of the machine will stop or reverse the motor. Remarkably, the distance between the hand and sensor which causes the warning signal is remarkably constant for essentially any orientation of the worker's hand and any curvature of the worker's fingers. Typically, the exact distance at which the warning signal is issued will not vary by more than a few millimeters. This prevents false alarms and allows the setting of a relatively high threshold which allows the worker to come within a centimeter or a few centimeters of the sensor without generating the warning signal.

The system desirably operates in what is commonly referred to as the "near field" region of the system. Typically, the distance where the warning signal is issued is less than the longest dimension of the ferromagnetic bar and less than the longest dimension of the X and Y coils. This distance typically is less than 25 cm, and more typically less than 10 cm, as, for example, 10 cm to 1 cm.

The threshold can be preset during manufacture of the system. In a further alternative, the threshold can be determined in a calibration step by observing the relationship between magnitude of the time-varying field in sensor 60 and the distance between the sender 10 and the sensor. In one variant of the calibration step, the output of combining circuit 90 is monitored, as by directing the output of the combining circuit to a numerical display, while sender 10 is moved towards and away from sensor 60. The threshold can be selected to correspond to the desired distance. In another variant, various settings of the threshold can be tried and the output of comparison circuit 92 on line 94 can be monitored to determine a distance associated with each threshold. The calibration step can be performed while the sensor 60 is mounted on the machine, but with the dangerous components of the machine disabled as, for example, by shutting off the motor 108 of the machine. This assures that the calibration step takes account of any effect of ferromagnetic components of the machine on the inductance between the coil 12 of the sender 10 and the sensor 60. Because the output of combining circuit 90 includes only the magnitude of the magnetic field component varying at the drive frequency, it is insensitive to stationary magnetic fields, such as the magnetic field of the earth and permanent magnets in the vicinity of the sensor. It is also insensitive to magnetic fields varying at other frequencies as, for example, stray magnetic fields from the motor 108 of the machine and from other electrical devices.

Numerous variations and combinations of the features set forth above can be used. For example, the detector circuit 70 can include amplifiers connected between each coil and the associated A/D converter. In a further variant, the circuit may include an analog filter having a pass band corresponding to the drive frequency, the analog filter being connected between each coil and the associated analog-to-digital converter. In a further variant, filtration of the coil signals may be omitted and the output of the calculator may be filtered to recover only a component which varies at the drive frequency.

Figure 6:
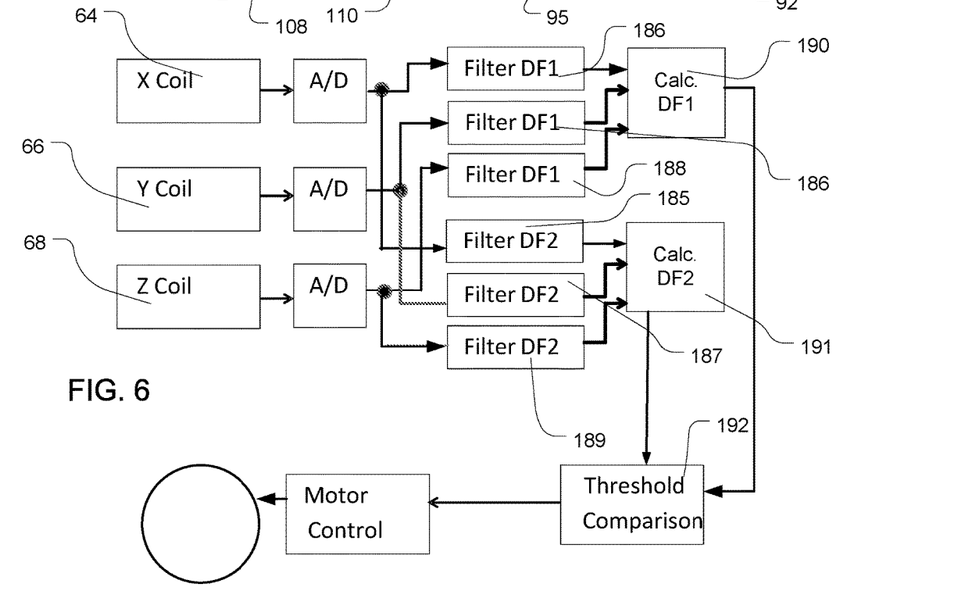
FIG. 6 is a functional block diagram depicting a circuit used in a system according to a further embodiment of the invention.

In the foregoing discussion, only a single sender mounted on one hand is employed. If two hands of a single worker, or two or more hands of multiple workers operating a single machine, are to be protected, each hand is equipped with a sender. The various senders may operate at the same drive frequency. Because the magnitude of the magnetic field in the sensor varies so dramatically with distance, it will be dominated by the component at the drive frequency caused the hand which happens to be closest at any given time. It is theoretically possible, however, that two or more hands could be positioned to induce fields of comparable magnitude but opposite directions in the sensor, so that the net field in the sensor at the drive signal is below the threshold even though both hands are within the danger zone. To avoid this possibility, the drive circuits associated with the individual senders may be set to different drive frequencies, and the detector circuit is arranged to recover the signals representing field components at the different drive frequencies, and determine the magnitude of the fields varying at the different drive frequencies. The detector circuit is arranged to issue the warning signal when the magnitude of any one of the fields at any one of the drive frequencies exceeds the threshold. As shown diagrammatically in FIG. 6, where two drive frequencies are used, the digitized coil signal from the X coil 64 is passed through a first filter 184 having a pass band at the first drive frequency and through a second filter 185 having a pass band at the second drive frequency. The digitized coil signals from Y coil 66 and Z coil 68 are passed through first filters 186 and 188 respectively, and through second filters 187 and 189 respectively. Thus, the sequences of digital values from the first filters represent the components of the magnetic field in the sensor varying at the first drive frequency. These values are combined with one another by a first calculator 190 in the manner discussed above to yield the magnitude of the field varying at the first drive frequency. The sequences of values from the second filters 185, 186 and 189 represent components of the magnetic field in the sensor varying at the second drive frequency. These values are combined with one another by a second calculator 190 in the manner discussed above to yield the magnitude of the field varying at the second drive frequency. The comparator 192 issues the warning signal when one or more of the magnitudes exceeds the threshold.

In the discussion above, frequency is used as the characteristic which distinguishes the time-varying magnetic field induced in the sensor by each sender from stray fields and from fields induced by other senders. However, the drive circuit of a sender may be arranged to modulate the magnetic field with other characteristics. For example, in a multi-sender embodiment, the drive signals may the same frequencies but different phases. In this case, the multiple filters may be phase-selective. Also, the drive signals may be time-multiplexed, so the each drive circuit actuates the associated sender for a brief interval, followed by another interval during which another sender is actuated. The detector circuit can separate the signals from the sensor which are acquired during the different intervals. In a further variant, the drive circuit of the sender may be arranged to apply a pulsatile drive signal which may be periodic or non-periodic, so as to induce a corresponding pulsatile magnetic field in the sensor. The detector circuit is arranged to filter the coil signals so as to provide filtered coil signals representing the pulsatile magnetic field induced in the sender. To facilitate this process, the detector circuit of the sensor may be synchronized with the drive circuit of the sensor as, for example, by a communication link carrying a synchronization signal between the sender and the sensor or by synchronization to a common master clock which may be external to the system as, for example, a broadcast signal such as the global positioning system signal. The term "drive characteristic" as used herein refers to any characteristic of periodic or aperiodic variation in a signal or magnetic field, and thus includes characteristics such as frequency or phase of a periodic signal or field, as well as timing of pulsatile signal or field and timing of a time-multiplexed periodic signal.

Figure 7:
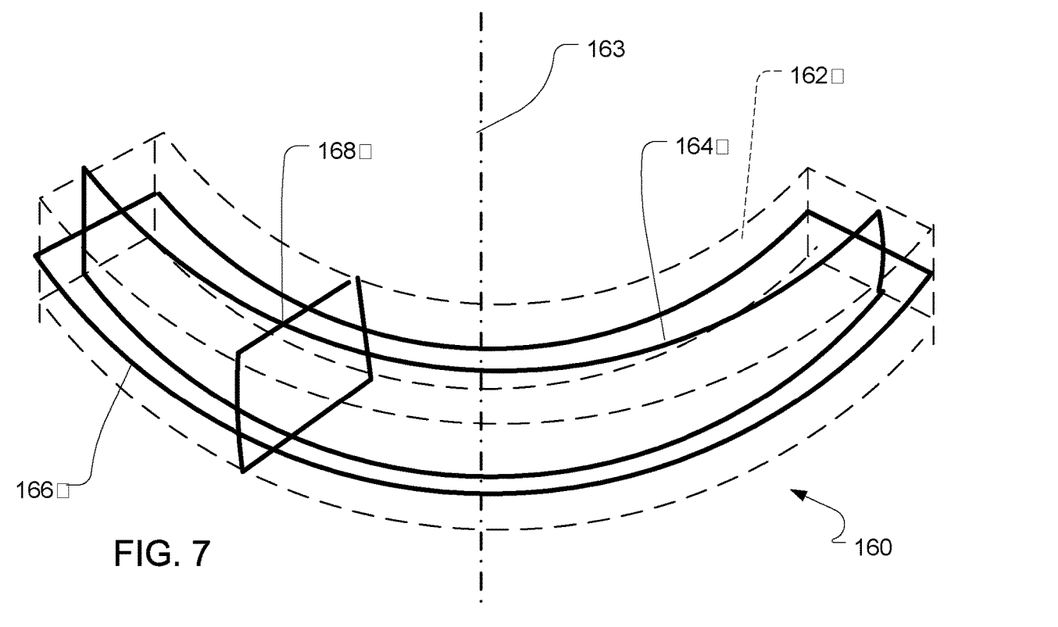
FIG. 7 is a view similar to FIG. 4 but depicting a unit used in a system according to yet another embodiment of the invention.

The configuration of the sensor can be varied. For example, the ferromagnetic bar of the sensor may be curved, and the sensor coils may be curved as well. For example, a sensor 160 depicted in FIG. 7 has an elongated ferromagnetic bar 162, depicted in broken lines, curved about an axis of curvature 163. A first coil has windings 164' which extend along the top and bottom of the bar and follow the curvature of the bar, so that the coil is sensitive to time-varying magnetic fields directed radially inward and outward, towards and away from the axis of curvature. A second coil has windings extending along the inner side of the bar facing toward axis 163 and on the outer side of the bar facing away from the axis, so that each winding lies in a plane perpendicular to the axis. This coil is sensitive to time-varying magnetic fields directed parallel to the axis. A third coil has windings 168' extending around the top, bottom and sides of the bar, so that the coil is sensitive to fields extending along the bar, i.e., circumferentially around the axis 163. In a further variant, the ferromagnetic bar may be replaced by a ferromagnetic body having a configuration other than an elongated bar as, for example, a sphere or cube. Such an arrangement can be used, for example, to protect a machine having a small danger zone.

In the embodiments discussed above, the multi-coil structure 60 acts as an omnidirectional sensor. That is, a magnetic field in any direction will be detected by one or more of the sensor coils. This is highly desirable because that portion of sender coil or inductor 12 disposed adjacent the sensor typically will provide a field in only one direction, dependent on the orientation of the user's hand and the positions of the user's fingers relative to the hand, neither of which is known or predictable. In a further variant, the multi-coil structure 60 can be actuated as an omnidirectional sender, operative to provide field components in three orthogonal directions which are distinguishable from one another by one or more characteristics such as frequency, phase or timing, so that at various times the field formed by the sum of these components is directed in different directions. The coil 12 acts as a unidirectional sensor. The detector circuit is coupled to the coil 12, and is constructed to separate the field components from one another and compute the magnitude of the vector sum of these components. Here again, this magnitude is proportional to the magnitude of a the vector sum of the inductive couplings between the multiple coils of the sensor and the coil of the inductor. If this magnitude rises above a threshold, the detector circuit issues the warning signal. If the detector circuit is carried on worker's hand, a communications link such as an radio frequency (RF) communication link or a hard-wired link is needed to send the warning signal to the machine.

In the embodiments discussed above, each of the coils of the sensor acts as a transducer which converts a time-varying magnetic field in one direction into an electrical signal. Each coil of the sensor may be replaced by one or more transducers other than a coil as, for example, one or more solid-state field sensors such as Hall effects or magnetoresistive sensors. The transducer or set of transducers which replace each coil desirably is or are sensitive to a magnetic field in one direction. The term "transducer signal" as used herein refers to a signal from a transducer which may be a coil or other transducer or set of transducers. Each of the coil signals referred to in the discussion above is a transducer signal. In a further variant, the ferromagnetic body may be omitted. The term "air core" sensor as used herein refers to a sensor without a ferromagnetic element within or adjacent the coils other transducers. In such a sensor, the elements of the transducer itself desirably are closely spaced. For example, in an elongated sensor, multiple sets of orthogonal coils or orthogonal solid-state field sensors can be placed along the length of the sensor.

Figure 8:
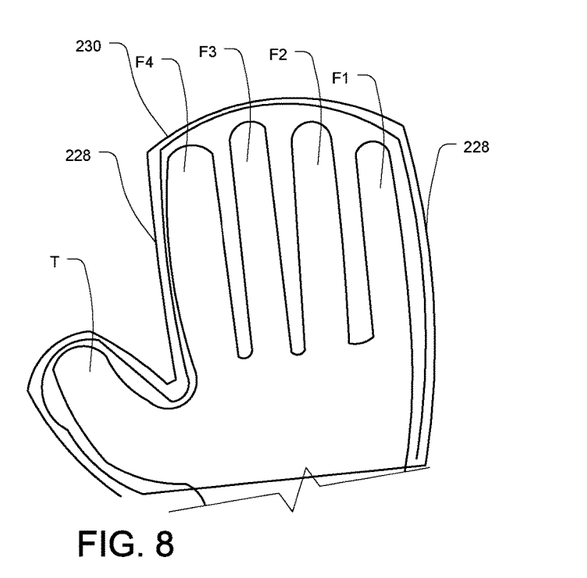
FIGS. 8 and 9 are views similar to FIG. 1 but depicting units according to still further embodiments of the invention.

The structure of the inductor may be varied as well. For example, it is not essential to form the coil 12 on a dielectric sheet 16 as discussed with reference to FIG. 1. The coil 12 may be formed directly on glove 18. It is also not essential to form the coil 12 as part of a complete glove. For example, a coil may be formed on a dielectric sheet 16 as in FIG. 1, and the sheet may be provided with adhesive to attach it to the worker's had or loops to attach the digit portions 22 of the sheet to the worker's fingers and thumb. Preferably, the coil 12 of the inductor includes five digit sections so as to protect all five of the worker's fingers. The coil 12 may include fewer than five digit sections, as, for example, if other equipment protects some of the digits from injury. In a further variant (FIG. 8) if two or more fingers of the worker's hand are held together as, for example, where the user is wearing a protective mitten, the coil may include a composite digit section with one run 228 of the digit section extending from the base of one of the fingers F1 to the tip of that finger, the bend 230 extending across the tips of the fingers F1-F4 held together, and the opposite run extending along the opposite one F4 of the fingers held together. A separate digit section may be provided for the thumb.

Figure 9:
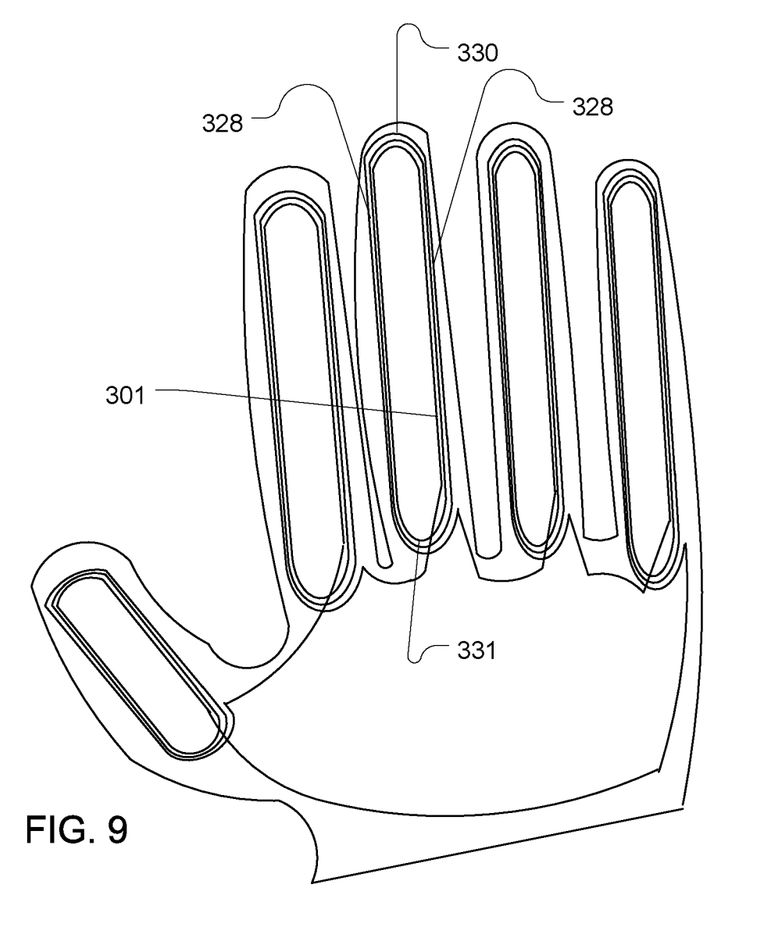

In a further variant (FIG. 9), each turn of a digit section may include runs 328 extending lengthwise along the worker's finger, a bend 330 adjacent the tip of the finger, and a further bend 331 connecting the runs adjacent the base of the finger. In this arrangement, each digit section acts a separate coil. The coils of the digit sections may be connected in series or parallel with one another. Because the connection to the innermost turn 301 of each coil must physically cross the other turns, such an arrangement typically requires a more complex manufacturing process.

As discussed above, the drive frequency or other characteristic used by the drive circuit in the sender should match the characteristic used by the sensor. The units may communicate with one another through a communications link such as a radio frequency link as, for example, a conventional Bluetooth channel, an optical communications link or a wired communications link, so that one unit may set the drive frequency or other characteristic and communicate this information to the other unit, and the other unit may set the characteristic accordingly. In a further variant, one unit (the sender or the sensor) may send a In a further variant, the unit which is intended to be worn by the worker may be arranged to detect whether or not it is actually being worn as, for example, by sensing skin contact, sensing the worker's pulse, sensing movement or the like, and communicate this a positive status to the other unit if the unit is being worn. The other unit may be arranged to send the warning signal or other signal to the machine to stop the machine if the positive status is not received.

In the embodiments discussed above, the hand of the worker constitutes the body part to be protected. In other embodiments, the system may protect other body parts. For example, a shoe may be provided with an inductor in its sole and the omnidirectional unit such as sensor 60 may be placed on or adjacent a floor to protect the foot of a worker from a danger zone near the floor.

Although the system has been described above with reference to a machine having a danger zone arising from operation of moving mechanical elements, it can be used to protect against other hazards such as electrical or chemical hazards within a danger zone. Thus, the term "machine" as used herein is not limited to machines having moving parts, but also includes other structures having other hazardous elements or conditions. Also, the system can be used in a simulation environment, as, for example, where a worker is operating in a virtual reality environment, and the danger zone is a region in real space corresponding to the location of a danger zone in the virtual reality environment. Also, in the embodiments discussed above, the motor controller of the machine acts to stop or reverse the machine responsive to the warning signal. In other embodiments, the safety system itself may include a device responsive to the warning signal for taking action to protect the worker responsive to the warning signal as, for example, by stopping or reversing the machine, by interposing a guard between the worker and the machine, or any other action.

As these and other variations and combinations of the features described above may be used, the foregoing description of the preferred embodiments should be taken as illustrating, rather than as limiting, the present invention.

The invention claimed is:

1. An element for use in a safety system comprising:
   (a) a support including a body region adapted to overlie at least a portion of a palm or back of a human hand and one or more elongated digit regions projecting from a base adjacent the body region to a tip remote from the body region, each digit region being adapted to overlie a digit of the hand when the body region overlies the palm or back of the hand;
   (b) an induction coil comprising one or more continuous conductive wires, each continuous conductive wire including one or more segments formed in a plurality of overlapping loops having a winding number of two or greater, each loop of the segment including a pair of elongated runs continuously extending from the base of one said digit region to the tip of that digit region and a bend adjacent the tip of that digit region; and
   (c) a drive circuit coupled to the induction coil and configured to apply a time-varying current to the induction coil.

2. An element as claimed in claim 1 wherein the support is in the form of a glove.

3. An element as claimed in claim 1 wherein the plurality of overlapping loops of at least one segment of the continuous conductive wire extends along a periphery of the body region.

4. An element as claimed in claim 1 further comprising a battery configured to power the drive circuit.

5. An element as claimed in claim 4 wherein the battery and the drive circuit are mounted on the support.

6. An element as claimed in claim 1, wherein the induction coil includes a plurality of continuous conductive wires in parallel with one another, wherein the respective pluralities of overlapping loops of the plurality of continuous conductive wires are positioned in different respective digit regions of the support.

7. An element as claimed in claim 1, wherein the induction coil comprises one continuous conductive wire including a plurality of wire segments connected in series to one another, each wire segment including a respective plurality of overlapping loops positioned in a different respective digit region of the support.

8. An element as claimed in claim 7 wherein the support is in the form of a glove.

9. An element as claimed in claim 7 wherein the plurality of overlapping loops of at least one segment of the continuous conductive wire extends along a periphery of the body region.

10. An element as claimed in claim 7, wherein the support includes five elongated digit regions, and wherein the continuous conductive wire includes five wire segments, each wire segment including a respective plurality of overlapping loops positioned in a different respective digit region of the support.

* * * * *